(12) United States Patent
Kuwamura

(10) Patent No.: US 6,238,249 B1
(45) Date of Patent: May 29, 2001

(54) OPTO-ELECTRIC COMMON JACK TYPE CONNECTOR

(75) Inventor: Yasukazu Kuwamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/520,322

(22) Filed: Mar. 7, 2000

(30) Foreign Application Priority Data

Mar. 30, 1999 (JP) .................................................... 11-88887

(51) Int. Cl.[7] .................................................... H01R 24/04
(52) U.S. Cl. .................................................... 439/668
(58) Field of Search ........................ 439/188, 669, 439/668, 541.5, 557, 554, 259, 266

(56) References Cited

U.S. PATENT DOCUMENTS

| | | | |
|---|---|---|---|
| 4,548,447 | * 10/1985 | Dinsmore | 439/668 |
| 5,338,215 | * 8/1994 | Lee et al. | 439/668 |
| 5,376,022 | * 12/1994 | Carr et al. | 439/668 |
| 5,947,771 | * 9/1999 | Bethurum | 439/668 |
| 6,116,961 | * 10/2000 | Henneberger | 439/668 |
| 6,126,465 | * 10/2000 | Franks, Jr. | 439/218 |

FOREIGN PATENT DOCUMENTS

| | | |
|---|---|---|
| 2-31735 | 8/1990 | (JP) . |
| 5-38326 | 9/1993 | (JP) . |
| 6-140106 | 5/1994 | (JP) . |

\* cited by examiner

*Primary Examiner*—Neil Abrams
*Assistant Examiner*—J. F. Duverne
(74) *Attorney, Agent, or Firm*—Dike Bronstein Roberts & Cushman, IP Group, Edwards & Angell LLP; David G. Conlin; Peter J. Manus

(57) ABSTRACT

A jack type connector 1, 21 includes: a retainer 2, 22 holding a converter 10, 30 and a first 11a, 11b, 11c, 31a, 31b, 31c and second 5, 6, 7, 8, 9, 25, 26, 27, 28, 29 terminals; and a plurality of ribs 4, 24 projecting from a peripheral portion of the retainer; wherein the retainer is fitted in a cutaway portion formed in a printed board 12 and having a configuration conformal to a profile of the retainer 2, 22 with the ribs 4, 24 abutting against the surface of the printed board 12 for engagement with the printed board.

8 Claims, 8 Drawing Sheets

| TYPE OF PLUG | OUTPUTS OF TERMINALS | |
|---|---|---|
| | V₁ | V₂ |
| ELECTRIC SIGNAL TRANSMISSION PLUG | LOW | LOW |
| OPTICAL SIGNAL TRANSMISSION PLUG | LOW | HIGH |
| NO PLUG | HIGH | HIGH |

OPTO-ELECTRIC COMMON JACK TYPE CONNECTOR

CROSS-REFERENCE TO RELATED APPLICATION

This application is related to Japanese application No. HEI 11-88887 filed on Mar. 30, 1999, whose priority is claimed under 35 USC §119, the disclosure of which is incorporated by reference in its entirety.

BACKGROUND OF THE INVENTION

1. Field of the Invention

The present invention relates to an opto-electric common jack type connector for connecting between digital audio systems and between information systems which use a disk or a cassette tape as a recording medium.

2. Description of the Related Art

There have been known conventional opto-electric common jack type connectors for connecting between digital audio systems, which are adapted to be mounted on a surface of a printed board, and comprise: an optical-to-electric converter or an electric-to-optical converter which receives and transmits an optical signal from/to an optical signal transmission plug provided at an end of a fiber optic cable for optical signal transmission when the optical signal transmission plug is connected to the jack type connector; terminals each extending from the converter and adapted to be fixed onto circuitry of the printed board for reception and transmission of an electric signal; terminals adapted to be fixed onto the circuitry of the printed board for receiving and transmitting an electric signal from/to an electric signal transmission plug when the electric signal transmission plug is connected to the jack type connector; and a retainer which holds the converter and the terminals (see, for example, Japanese unexamined Patent Publication No. Hei 6(1994)-140106).

In some of the jack type connectors, the retainer includes a resin molded body having a bottom wall of a reduced thickness for size reduction thereof.

For prevention of undesirable flexure of the terminals which may occur when the plug is inserted into the jack type connector, a consideration has been given to the configuration of the tips of the terminals.

The market of digital audio systems demands size and thickness reduction of portable systems such as portable MD systems and portable CD systems.

Since the conventional opto-electric common jack type connectors are adapted to be mounted on the printed board, an assembly of the printed board and the conventional opto-electric common jack type connector mounted thereon has a height (hereinafter referred to as "set total thickness") which equals to the thickness of the retainer plus the thickness of the printed board. Therefore, further reduction of the thickness is impossible.

The terminals to be used for mounting the jack type connector onto the board typically each have a straight configuration or an L-shaped bent configuration. Since the terminals include a movable terminal, phosphor bronze is commonly used as the material for the terminals in consideration of the movability of the movable terminal.

The movable terminal generally has a slightly greater length than the other terminals for prevention of the flexure of the movable terminal at the insertion of the plug.

The retainer has to accommodate therein the movable terminal with a sufficient room for movement of the longer movable terminal, resulting in an increase in the size of the opto-electric common jack type connector.

In view of the movability and possible flexure of the movable terminal, however, it is impossible to reduce the length of the movable terminal to less than the conventional level.

For reduction of the length of the movable terminal, it is necessary to reconsider materials for the movable terminal.

Another problem associated with the conventional opto-electric common jack type connector is that the resin molded body of the retainer has a great wall thickness to prevent a soldering flux from creeping up into the jack type connector from the surface of the printed board when the jack type connector is mounted onto the printed board by soldering.

For further reduction of the size and thickness of the opto-electric common jack type connector, the jack type connector should be designed so that the wall thickness of the resin molded body of the retainer is reduced as much as possible with the terminals being exposed to the outside.

Without any special consideration, the exposure of the terminals permits the soldering flux to creep into the jack type connector, making it impossible to establish an electrical connection between the plug and the terminals and locking the movable terminal.

SUMMARY OF THE INVENTION

In view of the foregoing, the present invention is directed to providing an opto-electric common jack type connector, which has a smaller size and a smaller set total thickness after the mounting of the jack type connector on the board and ensures easier soldering operation.

In accordance with the present invention, there is provided an opto-electric common jack type connector adapted to be mounted on a printed board for selectively receiving an optical signal transmission plug and an electric signal transmission plug for connecting thereto, the jack type connector comprising: an optical-to-electric converter or an electric-to-optical converter which receives and transmits an optical signal from/to the optical signal transmission plug when the optical signal transmission plug is connected to the jack type connector; a first terminal extending from the converter and adapted to be fixed onto a surface of the printed board for receiving and transmitting an electric signal; a second terminal adapted to be fixed onto the surface of the printed board for receiving and transmitting an electric signal from/to the electric signal transmission plug when the electric signal transmission plug is connected to the jack type connector; a retainer holding the converter and the first and second terminals; and a plurality of ribs projecting from a peripheral portion of the retainer; wherein the retainer is fitted in a cutaway portion formed in the printed board and having a configuration conformal to a profile of the retainer with the ribs abutting against the surface of the printed board for engagement with the printed board.

DETAILED DESCRIPTION OF THE INVENTION

Figure 18:
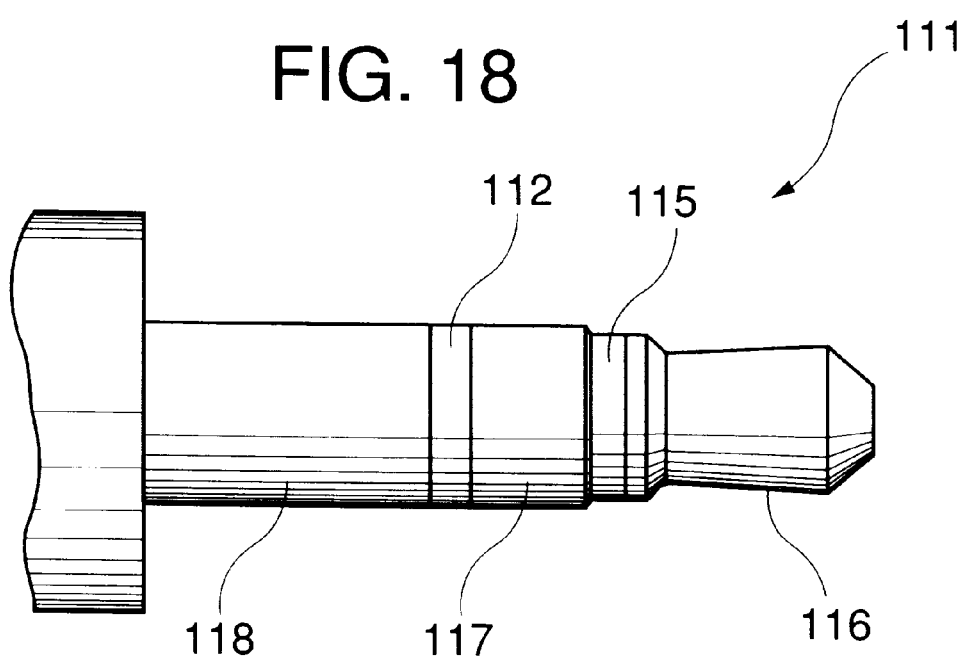
FIG. 18 is a left side view of an electric signal transmission plug.

The optical signal transmission plug to be employed in the present invention is a commercially available one which is adapted to be attached to an end of a fiber optic cable and has substantially the same size and exterior configuration as a common electric signal transmission plug as shown in FIG. 18. The electric signal transmission plug is, for example, a commercially available stereo plug.

Specifically, the ribs may be formed integrally with the retainer when the retainer is molded from a resin, and are preferably configured as extending from an upper portion of the retainer to abut against an upper surface of the printed board when the retainer is mounted on the board.

Alternatively, the ribs may be configured as extending from a lower portion of the retainer to abut against a lower surface of the printed board or as horizontally extending from the peripheral portion of the retainer to abut against the upper surface of the printed board.

The ribs may have any shape that ensures firm and stable attachment to the printed board.

In the opto-electric common jack type connector of the present invention, at least one of the first terminal and the second terminal preferably projects from the peripheral portion of the retainer so as to be brought into contact with the surface of the printed board when the retainer is fitted in the cutaway portion.

With this arrangement, the first terminal and the second terminal not only serve to receive and transmit an electric signal from/to circuitry of the printed board but also have the same function as the aforesaid ribs. Thus, the retainer can more firmly be fixed to the printed board.

In the opto-electric common jack type connector of the present invention, at least one of the first terminal and the second terminal preferably projects from the peripheral portion of the retainer and includes a bent portion having an angle of greater than 90 degrees so that a distal end thereof is inserted through a hole formed in the board when the retainer is fitted in the cutaway portion.

With this arrangement, the first or second terminal functions as a stay between the retainer and the printed board (hereinafter, this arrangement is referred to as "triangular configuration").

The triangular configuration improves the strength of the first and second terminals and the fixing strength of the retainer with respect to the printed board.

More specifically, the first and second terminals each including the bent portion angled at greater than 90 degrees may extend from either an upper side or a lower side of the retainer.

As long as at least one of the first and second terminals includes the bent portion angled at greater than 90 degrees and is inserted through the hole of the board to be fixed to the board for improvement of the strength of the first and second terminals, the configuration defined as described above is not limited to the triangular configuration but may be any other configuration such as rectangle.

In the present invention, the first and second terminals are preferably formed of a titanium-copper material for improvement of the strength (rigidity) thereof.

More specifically, the size reduction of the first and second terminals is required for the size reduction of the overall connector jack. The employment of the titanium-copper material allows for the size reduction as well as the improvement of the strength of the terminals.

Thus, the fixing strength of the retainer with respect to the printed board can be improved and, at the same time, the flexure of the terminals can be prevented.

Further, the titanium-copper material may be a quenched titanium-copper material.

Since the quenched titanium-copper material is capable of memorizing its initial shape, the use of the quenched titanium-copper material for the terminals is effective for prevention of the flexure of the terminals and particularly useful for the size reduction of a movable terminal.

Specifically, not all the first and second terminals are required to be formed of the titanium-copper material or the quenched titanium-copper material, but other materials such as phosphor bronze may be used depending upon required properties and strength of the terminals.

In the present invention, the opto-electric common jack type connector is preferably coated with a coating resin (e.g., a fluororesin) before the jack type connector is fixed onto the circuitry of the printed board by soldering, so that a resin coating prevents a soldering flux from adhering onto an unintended portion of the jack type connector.

More specifically, the formation of the resin coating is achieved by dipping the opto-electric common jack type connector in a fluororesin solution and drying the jack type connector.

Instead of the resin coating, an adhesive tape (e.g., a fluororesin adhesive tape) may be applied onto the retainer before the jack type connector is fixed onto the printed board by soldering, so that the tape prevents the soldering flux from adhering onto the unintended portion of the jack type connector.

The coating of the jack type connector with the coating resin or the adhesive tape prevents creeping-up of the soldering flux into the jack type connector which is problematic in the size and thickness reduction of the opto-electric common jack type connector.

Thus, the soldering flux is prevented from adhering onto the terminals so as not to hinder the electrical connection between the plug and the terminals nor to lock the movable terminal. This ensures stable reception and transmission of an optical signal and an electric signal.

In the present invention, the ribs may be adapted to abut against the surface of the board to prevent the retainer from tilting with respect to the board when the retainer is mounted onto the board.

Where the jack type connector is to be mounted in an apparatus which does not significantly require the thickness reduction, the jack type connector may be mounted onto the board in a conventional manner.

Even if the mounting of the jack type connector on the board is achieved in the conventional manner, the ribs provided on the retainer abut against the surface of the board and, therefore, the fixing strength of the retainer with respect to the board is improved as compared with the conventional jack type connector.

The present invention will hereinafter be described in detail by way of embodiments thereof illustrated in the attached drawings. It should be noted that the present invention be not limited by these embodiments.

Figure 3:
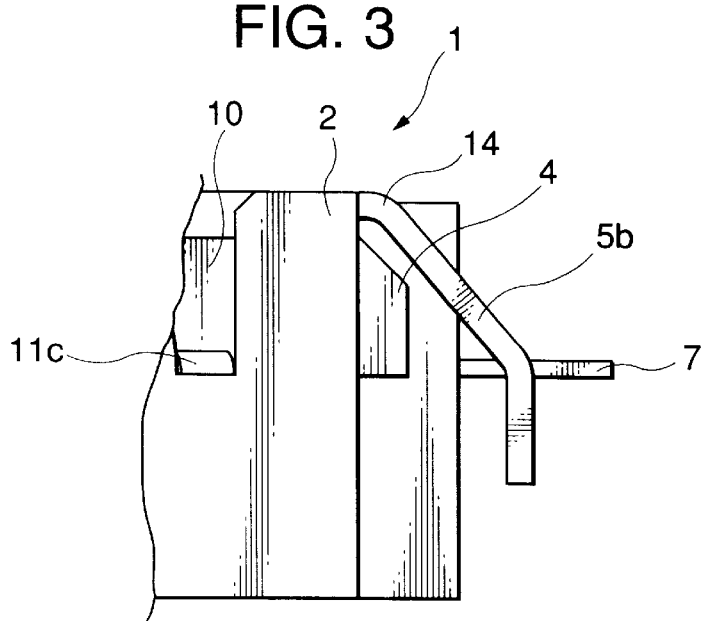
FIG. 3 is an enlarged view of a portion A shown in FIG. 2.
Figure 4:
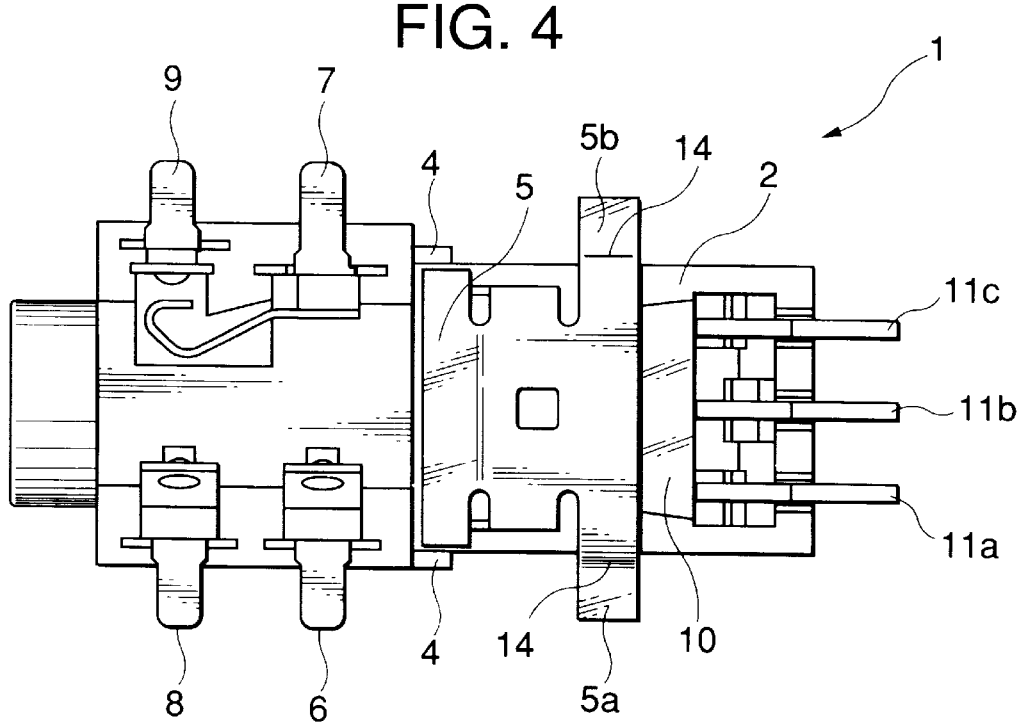
FIG. 4 is a plan view of the opto-electric common jack type connector of FIG. 1.

Referring to FIGS. 1 to 11, particularly to FIG. 4, an opto-electric common jack type connector, which is selectively applicable to an optical signal system and an electric signal system, comprises: an optical-to-electric converter 10 for receiving and transmitting an optical signal from/to an optical signal transmission plug 101 (FIG. 17) provided at an end of a fiber optic cable (not shown) for optical signal transmission when the optical signal transmission plug 101 is connected to the connector; first terminals 11a, 11b, 11c extending from the optical-to-electric converter 10 and adapted to be fixed onto circuitry of a printed board 12 (FIG. 7) for reception and transmission of an electric signal; second terminals 5, 6, 7, 8, 9 adapted to be fixed onto the circuitry of the printed board 12 for receiving and transmitting an electric signal from/to an electric signal transmission plug 111 (FIG. 18) when the electric signal transmission plug 111 is connected to the connector; a retainer 2 holding the optical-to-electric converter 10, the first terminals 11a, 11b, 11c and the second terminals 5, 6, 7, 8, 9; and a plurality of ribs 4 projecting from a peripheral portion of the retainer 2.

As shown in FIG. 4, the connector 1 of this embodiment includes the optical-to-electric converter 10 for inputting an optical signal to a digital audio system (not shown) from the fiber optic cable.

On the contrary, where an electric signal from the digital audio system is to be converted into an optical signal which is in turn outputted from the system, the conversion of the electric signal to the optical signal can be achieved by providing an electric-to-optical converter instead of the optical-to-electric converter 10.

Figure 1:
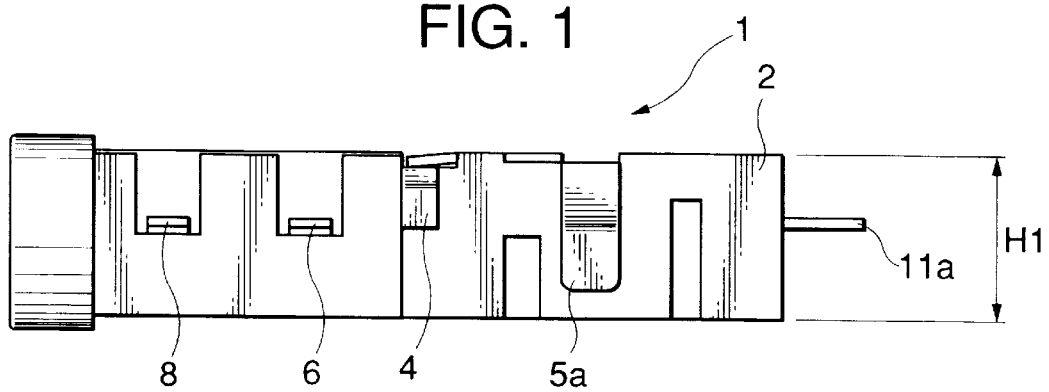
FIG. 1 is a right side view illustrating an opto-electric common jack type connector according to an embodiment of the present invention.
Figure 2:
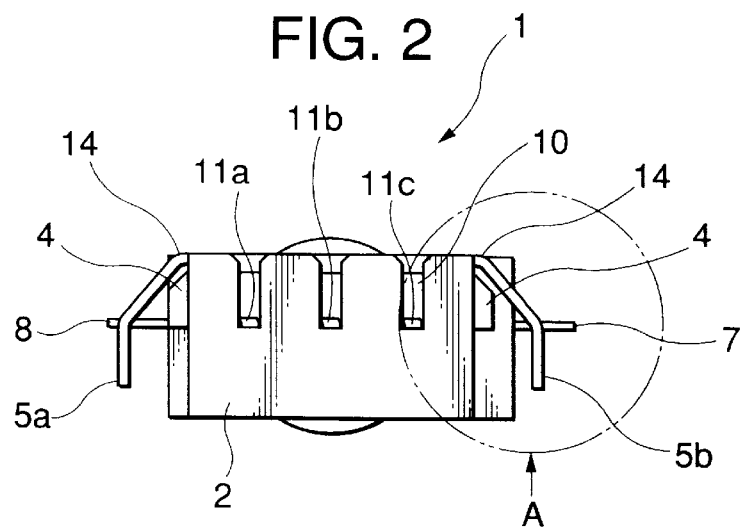
FIG. 2 is a rear view of the opto-electric common jack type connector of FIG. 1.

The retainer 2 of the connector 1 shown in FIG. 1 has a height H1 of 4.2 mm.

Figure 7:
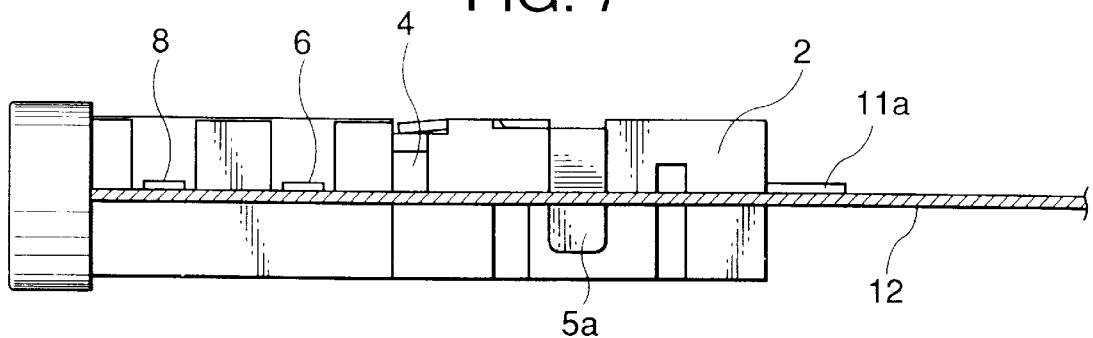
FIG. 7 is a right side view of the opto-electric common jack type connector of FIG. 1 which is attached to a printed board.
Figure 8:
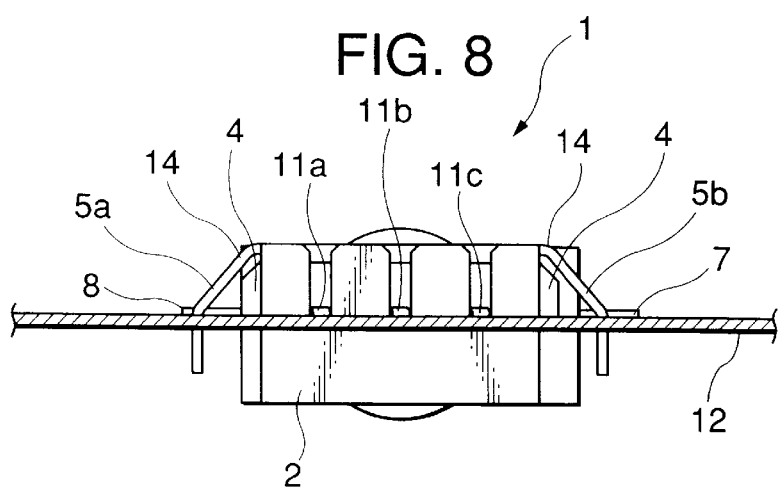
FIG. 8 is a rear view of the opto-electric common jack type connector of FIG. 7.
Figure 9:
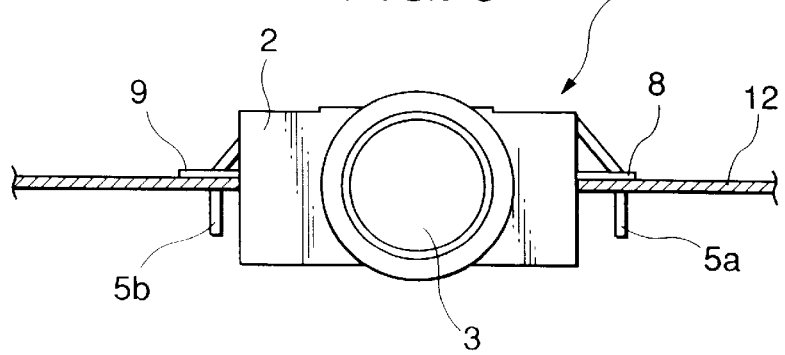
FIG. 9 is a front view of the opto-electric common jack type connector of FIG. 7.

As shown in FIGS. 7 to 9, the opto-electric common jack type connector 1 is fixed to the printed board 12 with a generally middle portion of the retainer 2 between an upper face and a lower face thereof being fitted in a cutaway portion formed in the printed board 12. That is, the thickness of the connector 1 mounted on the printed board 12 is only 4.2 mm, as shown in FIGS. 7 to 9, which is equal to the height of the retainer 2.

Therefore, the set total thickness of the connector 1 is smaller by the thickness of the board than the set total thickness of the conventional connector.

Figure 5:
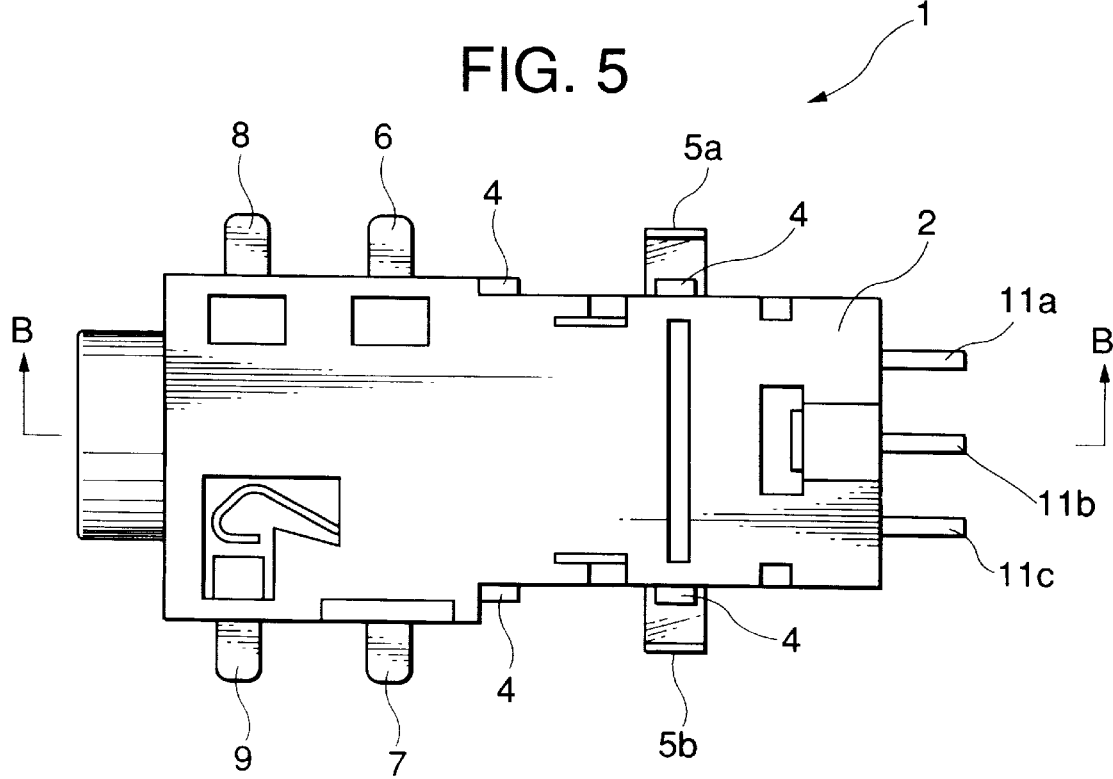
FIG. 5 is a bottom view of the opto-electric common jack type connector of FIG. 1.

In this embodiment, as shown in FIG. 5, the retainer 2 of the connector 1 is formed with two ribs on a right face and two ribs on a left face, a total of four ribs, which have been formed of a resin integrally with the retainer 2.

Since one face of each of the ribs 4 abuts against the surface of the printed board 12 as shown in FIGS. 7 to 9, the connector 1 is stably fixed onto the printed board 12.

As shown in FIGS. 3, 8 and 9, portions 5a, 5b of the second terminal 5 of the connector 1 which are used to fix the connector 1 onto the printed board 12 each have a bent portion 14 (FIG. 3), and form a triangular configuration between the surface of the printed board 12 and the upper surface of the opto-electric common jack type connector 1.

This improves not only the strength of the terminals per se but also the fixing strength of the connector 1 with respect to the printed board 12.

The second terminals 5, 6, 7, 8, 9 shown in FIG. 4 are each formed of a titanium-copper material which is superior in strength (e.g., rigidity) to the conventional material such as phosphor bronze.

Particularly, the second terminal 7 which is a movable terminal has been subjected to a quenching process. Since the second terminal 7 memorizes its initial shape, the second terminal 7 has a movability which is equivalent to that of the conventional movable terminal formed of phosphor bronze.

Figure 6:
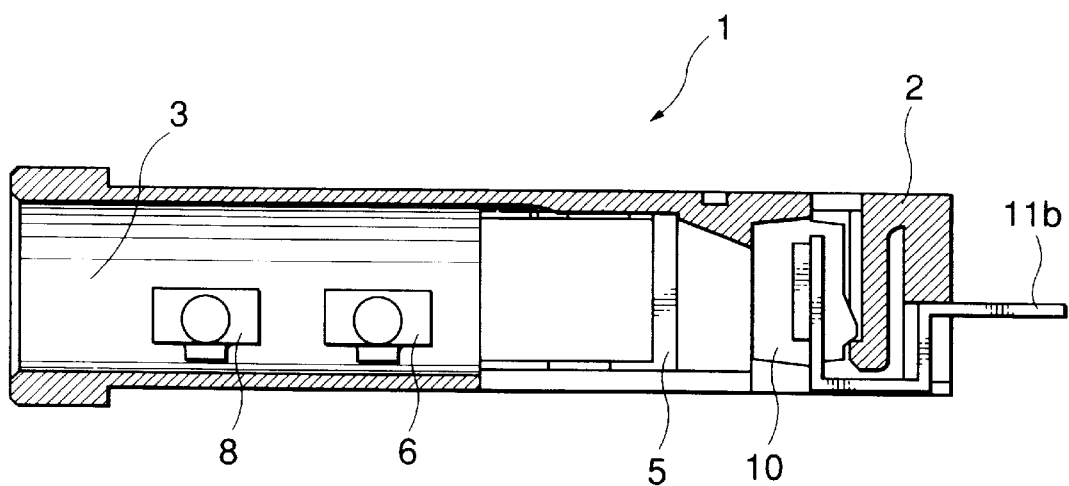
FIG. 6 is a sectional view of the opto-electric common jack type connector taken along a line B—B in FIG. 5.

The second terminals 5, 6, 7, 8, 9 of the connector 1 of FIG. 4 which are each formed of the titanium-copper material are less liable to be bent even if the optical signal transmission plug 101 (FIG. 17) or the electric signal transmission plug 111 (FIG. 18) is squeezed into or wrenched out of the connector 1 through an insertion port 3 of the connector 1 (FIGS. 6 and 9). The connector 1 has a durability sufficient to withstand more than 5,000-time insertion and withdrawal. In addition, the fixing strength of the connector 1 with respect to the printed board 12 can be improved.

The second terminals 5, 6, 7, 8, 9 typically have a thickness of 0.2 mm or 0.25 mm.

Figure 10:
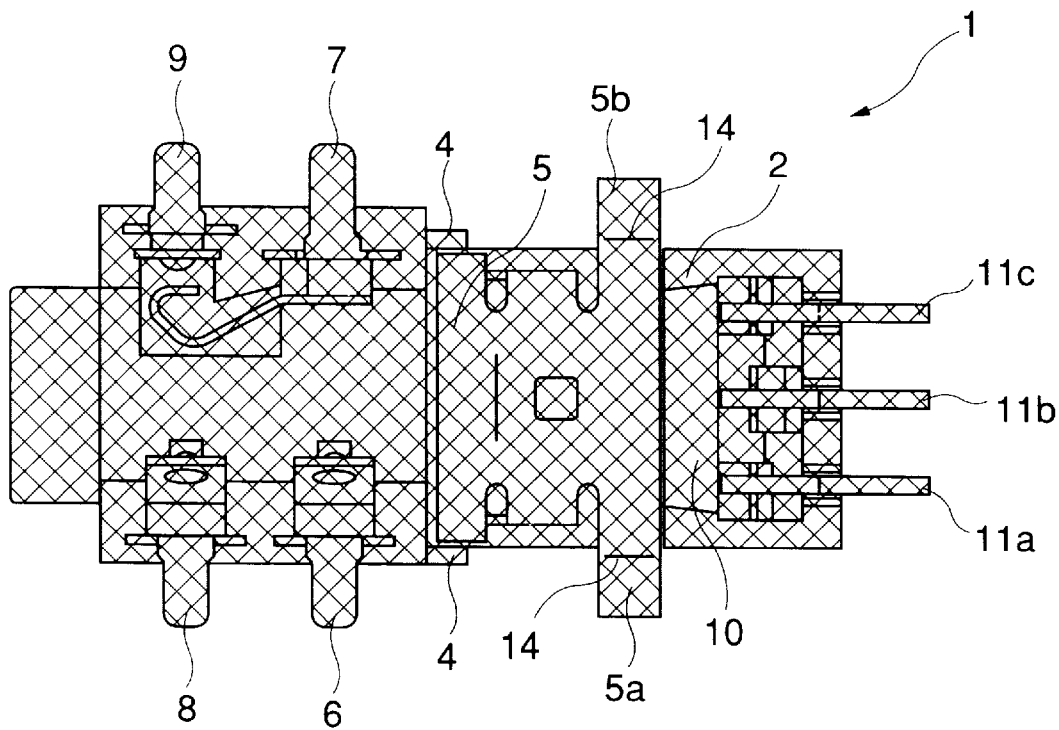
FIG. 10 is a plan view of the opto-electric common jack type connector of FIG. 1, wherein a portion thereof coated with a coating resin is cross-hatched.
Figure 11:
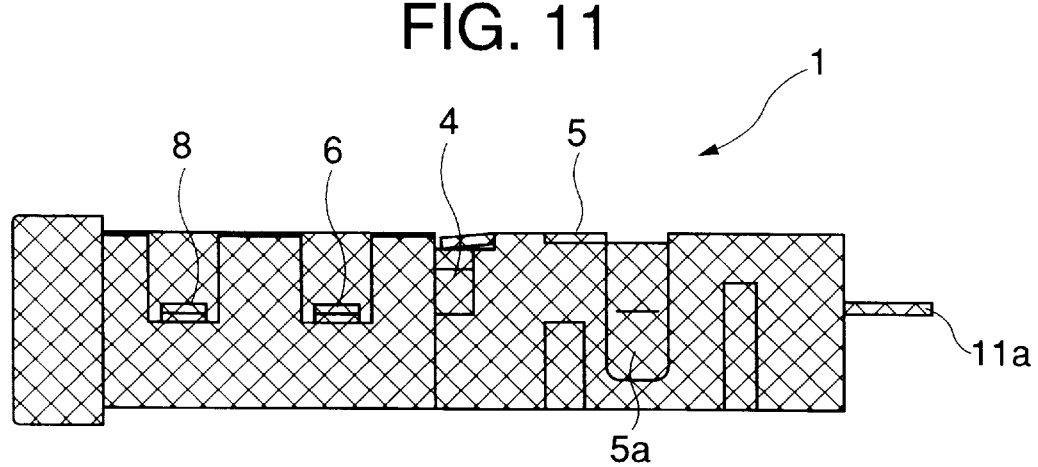
FIG. 11 is a right side view of the opto-electric common jack type connector of FIG. 10.

The connector 1 has a resin coating formed on a cross-hatched portion thereof as seen in FIGS. 10 and 11 by dipping the entire connector 1 in a fluororesin solution for a given period and drying the connector 1.

The resin coating repels a soldering flux which is used when the connector 1 is fixed to the printed board 12 as shown in FIGS. 7 to 9.

Therefore, the soldering flux will never creep up into the connector 1 through the first terminals 11a, 11b, 11c and the second terminals 5, 6, 7, 8, 9.

Figure 12:
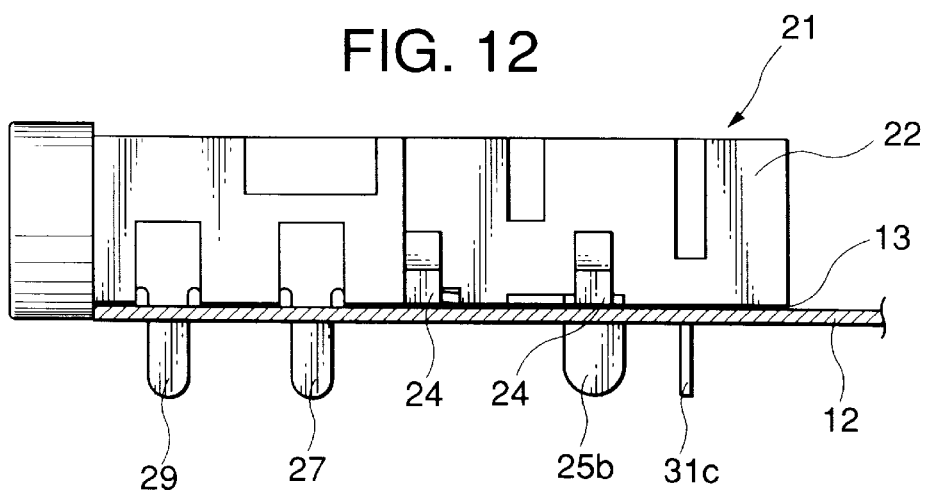
FIG. 12 is a right side view illustrating an opto-electric common jack type connector according to another embodiment of the present invention to which an adhesive tape is applied.
Figure 13:
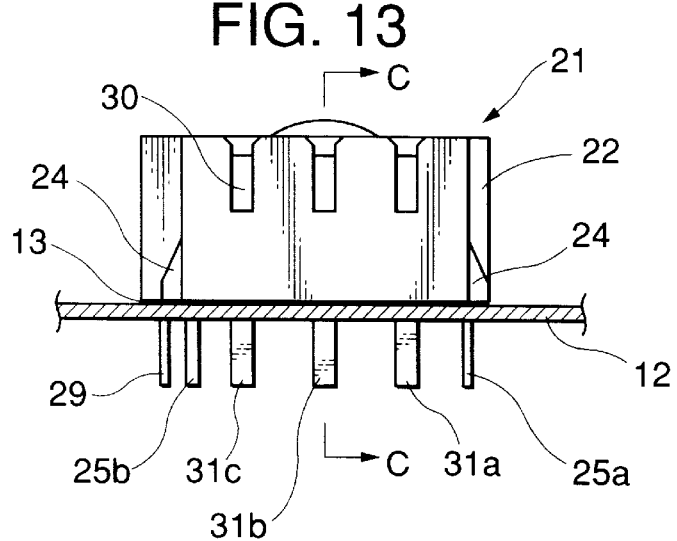
FIG. 13 is a plan view of the opto-electric common jack type connector of FIG. 12.
Figure 14:
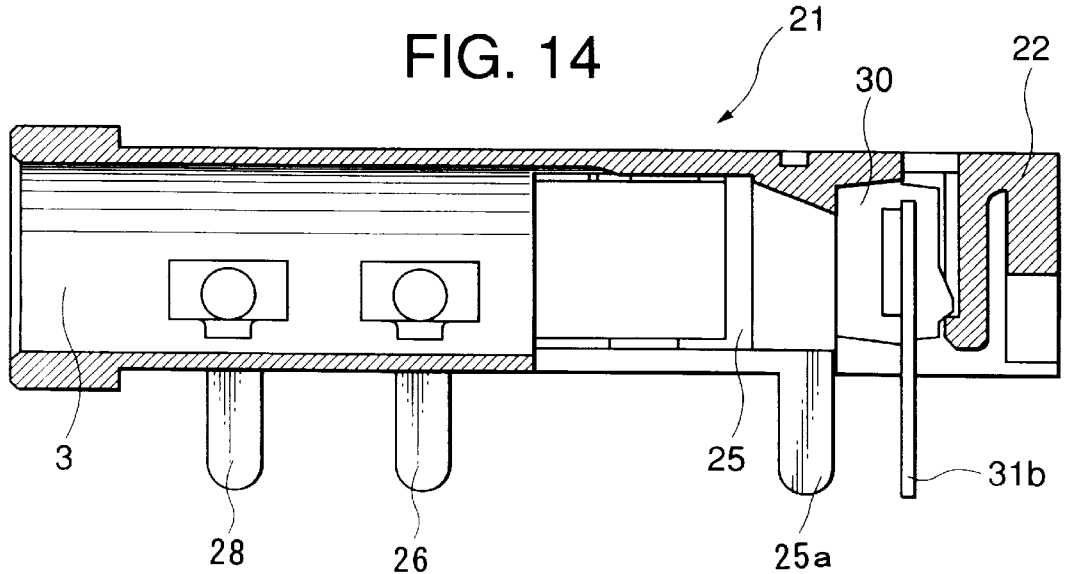
FIG. 14 is a sectional view of the opto-electric common jack type connector taken along a line C—C in FIG. 13.

With reference to FIGS. 12 to 14, an explanation will next be given to an opto-electric common jack type connector 21 according to another embodiment of the present invention.

The connector 21 shown in FIGS. 12 to 14 is mounted on the printed board 12 with its second terminals 25, 26, 27, 28, 29 and first terminals 31a, 31b, 31c of an optical-to-electric converter 30 each extending straight from the bottom face of a retainer 22 perpendicularly to the surface of the board.

As compared with the retainer 2 of the connector 1 shown in FIGS. 1 to 11, the retainer 22 of the connector 21 is inverted with ribs 24 being located in different positions.

The connector 21 shown in FIGS. 12 to 14 is applicable to a non-portable digital audio system, a DVD player or the like which does not significantly require the size and thickness reduction thereof, and can firmly be fixed to the printed board.

In the connector 21, as shown in FIGS. 12 and 13, a fluororesin adhesive tape 13 is applied on the bottom face of the retainer 22 to prevent the soldering flux from creeping up into the connector 21 when the connector 21 is fixed to the printed board 12.

The adhesive tape 13 forms a film repellent to the soldering flux between the printed board 12 and the opto-electric common jack type connector 21.

Therefore, the solder flux will never creep up from the first terminals 31a, 31b, 31c nor from the second terminals 25, 26, 27, 28, 29.

The use of the adhesive tape 13 is advantageous in that the connector 21 is applicable to a product which employs an IC chip, because the adhesive tape 13 is excellent in heat resistance, chemical resistance, water resistance and the like and is not static-prone.

As shown in FIGS. 12 and 13, the connector 21 includes ribs 24 integrally formed with the retainer 22.

Since the retainer 22 is supported by the ribs 24 so as not to be tilted with respect to the printed board 12, the connector 21 is firmly fixed to the printed board 12.

The function of the connector 1 shown in FIG. 1 will next be described with reference to FIGS. 15 to 18.

Although the connector 1 shown in FIG. 1 has a smaller size and thickness than the conventional connector, the connector 1 has substantially the same function as the conventional connector.

Figure 17:
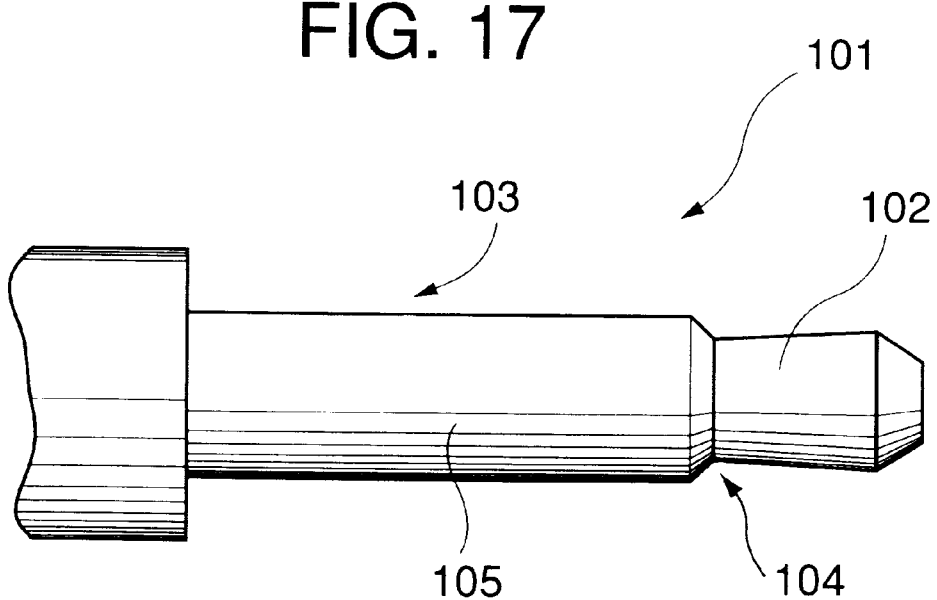
FIG. 17 is a left side view of an optical signal transmission plug.

That is, the connector 1 is selectively connected to the optical signal transmission plug 101 shown in FIG. 17 and to the electric signal transmission plug 111 shown in FIG. 18 thereby to serve for the optical transmission as well as for the electrical transmission.

The optical signal transmission plug 101 shown in FIG. 17 has substantially the same exterior configuration as the co mmercially available existing electric signal transmission plug 111 shown in FIG. 18.

More specifically, the optical signal transmission plug 101 includes a single head portion 102 and a base portion 103 which have the same shapes as those of the electric signal transmission plug 111, and further includes a neck portion 104 provided between the single head portion 102 and the base portion 103.

A portion of the optical signal transmission plug 101 of FIG. 17 extending from the neck portion 104 to the base portion 103 is covered with an insulative resin portion 105.

That is, the optical signal transmission plug 101 is different from the electric signal transmission plug 111 shown in FIG. 18 in that the plug 101 does not have electrodes 116, 117, 118.

The electric signal transmission plug 111 of FIG. 18 further includes annular insulating portions 112, 115 which electrically isolate the electrodes 116, 117, 118 from each other.

Figures 15, 16:
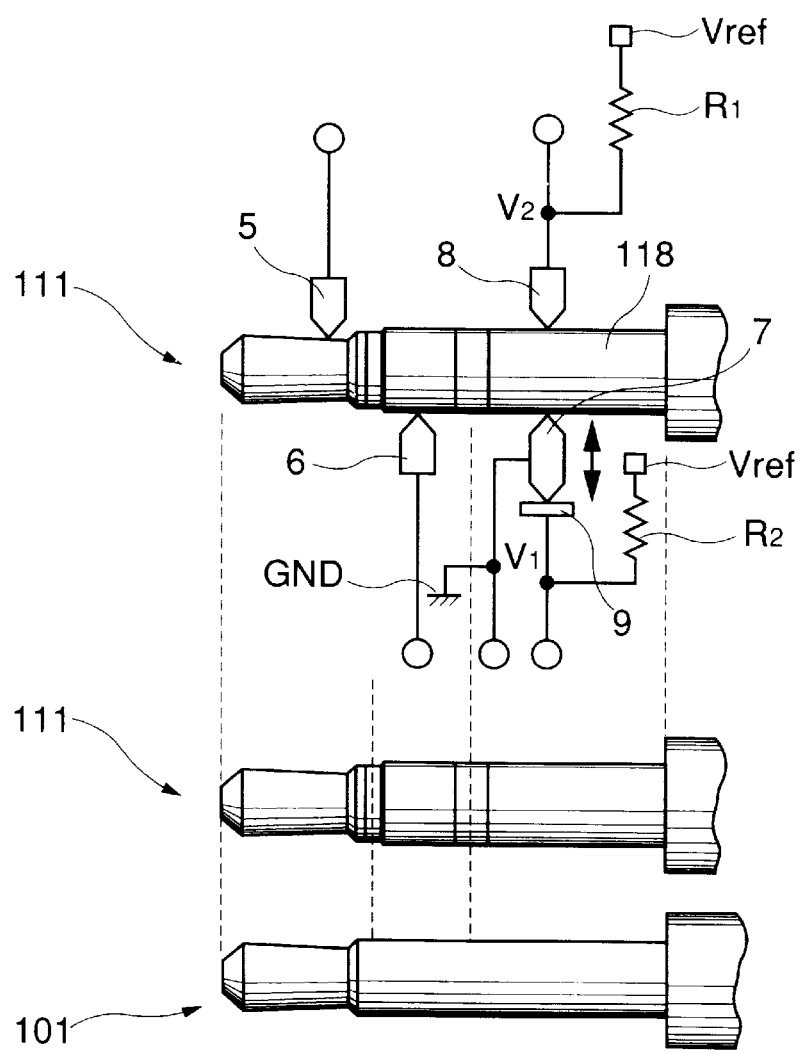
FIG. 15 is a conceptual circuit diagram of an opto-electric common jack type connector according to the present invention.
FIG. 16 is a diagram showing the potentials of second terminals which depend on the absence or presence of a plug and the type of the plug.

For use with either of the plugs having the aforesaid configurations, the second terminals 5, 6, 7, 8, 9 of the connector are laid out as shown in FIG. 15. This allows for detection of insertion of the plug and identification of the inserted plug (i.e., the optical signal transmission plug 101 or the electric signal transmission plug 111).

More specifically, the second terminal 7 serves as a ground terminal which is connected to the ground (GND), and the second terminals 8, 9 are connected to a constant voltage power source Vref via resistor elements (pull-up resistors) R1 and R2, respectively, as shown in FIG. 15.

Referring to FIGS. 15 and 16, when the optical signal transmission plug 101 or the electric signal transmission plug 111 is inserted in the connector with continuity being established between the second terminals 7 and 9, the second terminal 9 shorts with the ground and, hence, the voltage (output) $V_1$ of the second terminal 9 is low.

When the inserted optical signal transmission plug 101 or electric signal transmission plug 111 is withdrawn from the connector, the second terminal 9 is disconnected from the second terminal 7, so that the voltage $V_1$ of the second terminal 9 is high.

The detection of the plug is achieved by sensing the voltage $V_1$ of the second terminal 9 and determining the voltage level by means of an external system such as a microprocessor provided on a mount substrate.

As shown in FIGS. 15 and 16, when the electric signal transmission plug 111 is inserted in the connector with continuity being established between the second terminals 7, 8 and the electrode 118 of the electric signal transmission plug 111, the second terminal 8 shorts with the ground via the electrode 118 of the electric signal transmission plug 111 and the second terminal 7 and, hence, the voltage (output) $V_2$ is low.

Where neither the optical signal transmission plug 101 nor the electric signal transmission plug 111 is inserted in the connector or where the optical signal transmission plug 101 is inserted in the connector with its insulative resin portion 105 kept in contact with the second terminal 8, the voltage $V_2$ is high.

Similarly to the detection of the plug insertion, the identification of the inserted plug (i.e., the optical signal transmission plug 101 or the electric signal transmission plug 111) can be achieved by sensing the voltage $V_2$ of the second terminal 8 and determining the voltage level by means of an external system such as a microprocessor provided on the mount substrate.

The connector 21 shown in FIGS. 12 to 14 also functions in the aforesaid manner.

In general, when a voltage is applied to the electric signal transmission plug 111, an electric signal other than signals originally intended to be inputted or outputted through the electric signal transmission plug 111 is inputted into the electric signal transmission plug.

Consequentially, this mixes a noise into the original signals. However, a circuit for the detection of the plug insertion and the identification of the type of the plug is operative with application of a very small electric current, because the second terminal 7 is connected to the ground.

Therefore, the noise in the original signals is not problematic in practice.

In accordance with the present invention, the set total thickness of the opto-electric common jack type connector mounted on the printed board can be reduced, and the fixing strength of the opto-electric common jack type connector with respect to the board can be improved.

What we claim is:

1. An opto-electric common jack type connector adapted to be mounted on a printed board for selectively receiving an optical signal transmission plug and an electric signal transmission plug for connecting thereto, the jack type connector comprising:

an optical-to-electric converter or an electric-to-optical converter which receives and transmits an optical signal from/to the optical signal transmission plug when the optical signal transmission plug is connected to the jack type connector;

a first terminal extending from the converter and adapted to be fixed onto a surface of the printed board for receiving and transmitting an electric signal;

a second terminal adapted to be fixed onto the surface of the printed board for receiving and transmitting an electric signal from/to the electric signal transmission plug when the electric signal transmission plug is connected to the jack type connector;

a retainer holding the converter and the first and second terminals; and a plurality of ribs projected externally of the retainer;

wherein the retainer is fitted partway into a cutaway portion formed in the printed board, the cutaway portion having a configuration conformal to a profile of the retainer, the ribs engaging against the surface of the printed board for fixing the retainer to the printed board.

2. The opto-electric common jack type connector of claim 1, wherein at least one of the first terminal and the second terminal projects from the peripheral portion of the retainer so as to be brought into contact with the surface of the board when the retainer is fitted in the cutaway portion.

3. The opto-electric common jack type connector of claim 1, wherein at least one of the first terminal and the second terminal projects from the peripheral portion of the retainer and includes a bent portion having an angle of greater than 90 degrees so that a distal end thereof is inserted through a hole formed in the board when the retainer is fitted in the cutaway portion.

4. The opto-electric common jack type connector of claim 1, wherein the first and second terminals are formed of a titanium-copper material.

5. The opto-electric common jack type connector of claim 1, wherein the first and second terminals are formed of a quenched titanium-copper material.

6. The opto-electric common jack type connector of claim 1, wherein the jack type connector is coated with a coating resin before the jack type connector is fixed onto the circuitry of the printed board by soldering, so that a resin coating prevents a soldering flux from adhering onto an unintended portion of the jack type connector.

7. The opto-electric common jack type connector of claim 1, wherein an adhesive tape is applied onto the retainer before the jack type connector is fixed onto the printed board by soldering, so that the tape prevents the soldering flux from adhering onto the unintended portion of the jack type connector.

8. An opto-electric common jack type connector adapted to be mounted on a printed board for selectively receiving an optical signal transmission plug and an electric signal transmission plug for connecting thereto, the jack type connector comprising:

an optical-to-electric converter or an electric-to-optical converter which receives and transmits an optical signal from/to the optical signal transmission plug when the optical signal transmission plug is connected to the jack type connector;

a first terminal extending from the converter and adapted to be fixed onto a surface of the printed board for receiving and transmitting an electric signal;

a second terminal adapted to be fixed onto the surface of the printed board for receiving and transmitting an electric signal from/to the electric signal transmission plug when the electric signal transmission plug is connected to the jack type connector;

a retainer holding the converter and the first and second terminals; and a plurality of ribs projected externally of the retainer;

wherein the ribs are adapted to engage against the surface of the board to prevent the retainer from tilting with respect to the board when the retainer is mounted onto the board.

* * * * *